Figure 1:
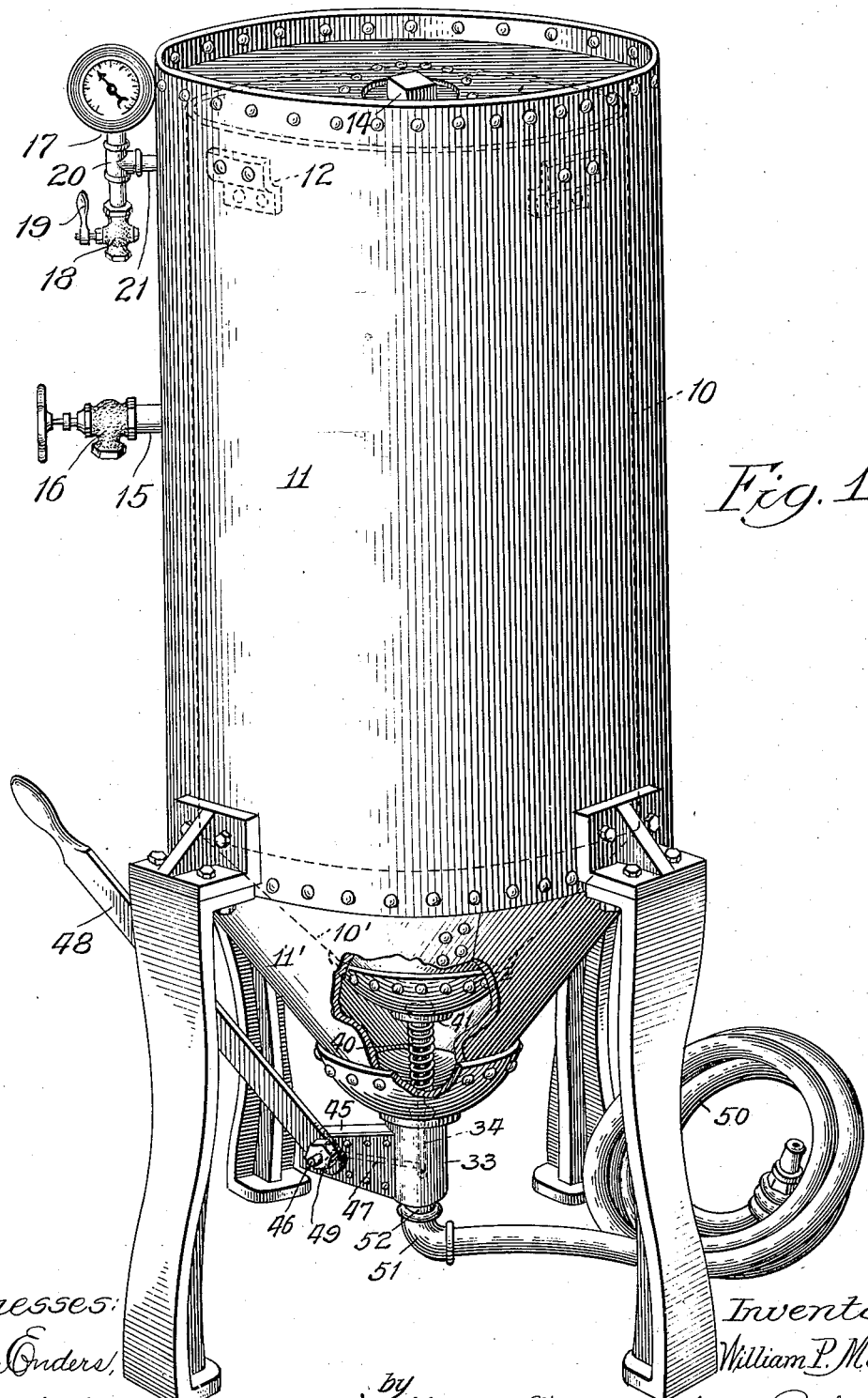

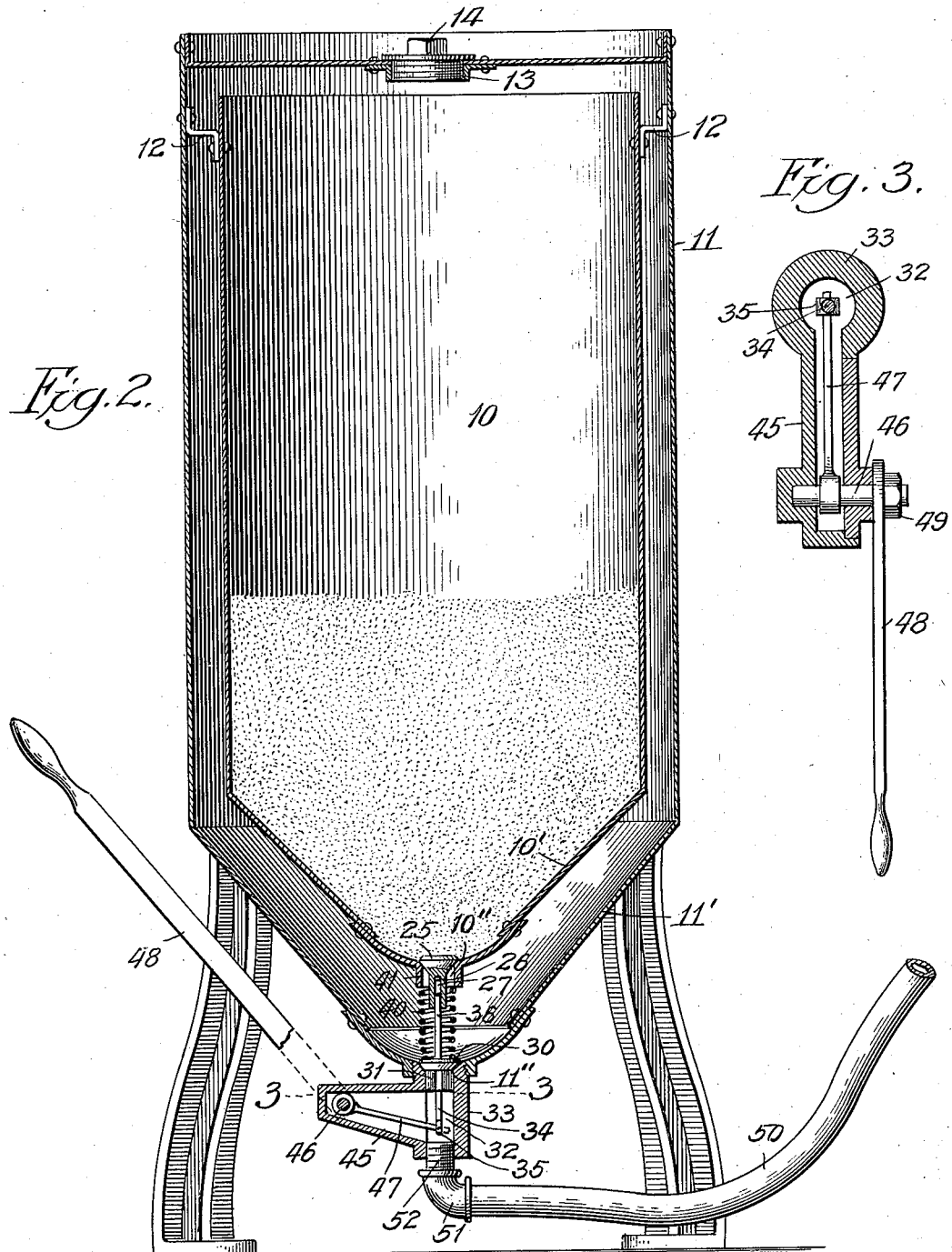

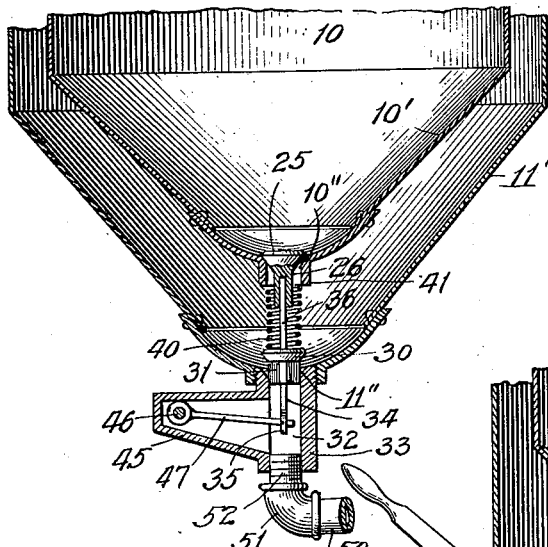
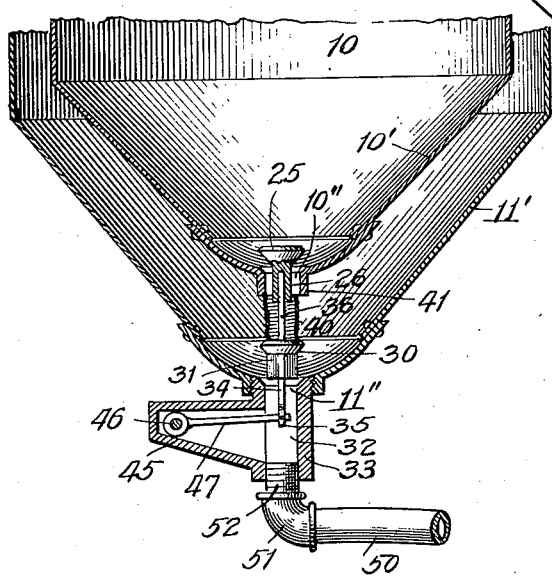
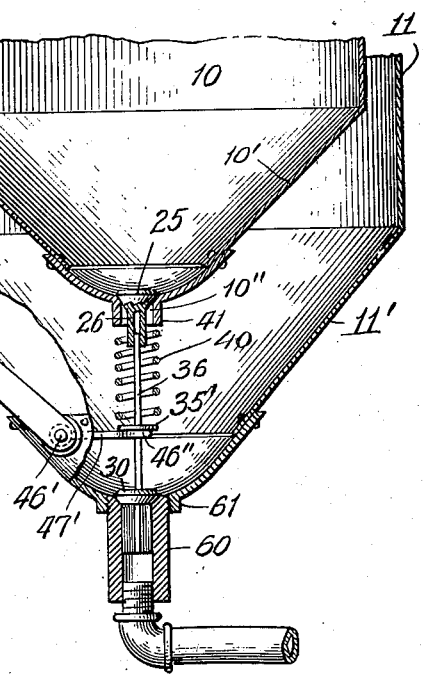

UNITED STATES PATENT OFFICE.

WILLIAM P. MOTT, OF CHICAGO, ILLINOIS.

SAND-BLAST.

1,191,719.     Specification of Letters Patent.     Patented July 18, 1916.

Application filed November 4, 1912. Serial No. 729,458.

*To all whom it may concern:*

Be it known that I, WILLIAM P. MOTT, a citizen of the United States, residing at Chicago, in the county of Cook and State of Illinois, have invented certain new and useful Improvements in Sand-Blasts, of which the following is a specification.

This invention relates to improvements in sand blast machines, and it is my object to provide a device which will be capable of use for sand blasting, or the spraying of other materials, such as paint, or disinfectants. Hitherto in the construction of such machines it has been customary to employ a source of air and material-containing receptacle relatively separate, the mixing of the air and material being accomplished by some special form of mixing chamber, or its equivalent.

In my device I provide a compact apparatus in which the material-receptacle is contained within the air tank and means is provided to control the flow of the air and material and to control the mixture thereof.

Other objects will be set forth and made apparent in the following specification and accompanying drawings, in which—

Figure 1 is a perspective view of my device, part of the outer tank being broken away; Fig. 2, a longitudinal vertical section through the same; Fig. 3, a section taken along the line 3, 3 of Fig. 2; Fig. 4, a detail cross section, showing the valve and operating means in closed position; Fig. 5, a view similar to Fig. 4, showing the valve structure in open position; Fig. 6, a view similar to Figs. 4 and 5, showing a slightly modified form of my device.

Like numerals refer to like elements throughout the drawings, in which—

10 designates what I term a material-receptacle open at the top and intended to contain the sand, paint, or other material. This receptacle 10 is located within and supported by the main tank 11, being retained out of contact therewith by the supporting brackets 12, as shown in Fig. 2 of the drawings. This tank 11 is air-tight and is provided with a filler opening 13 in the top thereof in which is threadedly inserted a plug 14. It is obvious that by removing the latter, sand or other material to be sprayed may be poured in through the open top of the receptacle 10 to fill the latter. A pipe 15 projects outwardly from one side of the air tank 11 and is provided with the valve 16 to which is adapted to be connected an air pipe leading from any suitable source of air supply. A gage 17 and a blow-off cock 18, having an operating handle 19, are secured by a T-coupling 20 to the pipe 21 at the side of the tank 11 and communicate with the interior thereof.

The tanks 10 and 11 are preferably provided with converging lower portions 10' and 11', respectively, the former having the outlet opening 10'' and the latter the opening 11'', the said openings being preferably in alinement, one above the other, as shown in Fig. 2. The valve 25 is seated in and adapted to close the outlet aperture 10'' while a similar valve 30 is seated in and adapted to close the aperture 11''. The valve 25 is provided with a downwardly extending stem centrally apertured at 27. The valve 30 is provided with a shank or stem 31 flanged to closely fit the periphery of aperture 32 in the outlet duct member 33. An operating rod 34 depends from and is secured to the stem 31 of the valve 30. This valve rod is provided with an eye 35 in its lower extremity. Projecting upwardly from the valve 30 is the rod 36 having its upper end slidably mounted in the aperture 27 in the valve stem 26. This rod 36 is preferably formed integrally with the valve 30 and with its upper end terminating short of the upper end of aperture 27 when in the position shown in Fig. 2 of the drawings.

A helical spring 40 surrounds the rod 36 and has its lower end seated on the upper surface of valve 30 and its upper end contacting with the lower surface of boss 41 which depends from the lower portion of tank 10. The outlet duct member 33 is provided with the outwardly extending elbow portion 45 through which passes a shaft 46 to which is secured the rod 47 at one extremity thereof. The opposite extremity of the rod 47 passes through the eye 35 in the rod 34 and is slidably mounted therein. The shaft 46 is movably mounted in the sides of the elbow portion 45. Secured to one end of said rod 46 is the operating handle 48 held in place by a nut 49, or the like.

It will be apparent from the above that in the operation of my improved device, after filling the receptacle 10 with sand, or other material, and screwing the plug 14 into place, air may be supplied to the tank 11 by means of the valve 16, the pressure inside said tank being indicated by the gage 17. It will be apparent that the top of the receptacle 10 being open, full pressure of the air within tank 11 will be exerted downwardly on top of the contents of the receptacle 10. Previous to utilizing the sand blast or spray, the operating handle 48 may be moved downwardly a slight distance, operating through the medium of the shaft 46 and rod 47 to raise the rod 34 a slight distance, thus raising the valve 30 a sufficient amount to allow air to blow out from the interior of tank 11 through the aperture 11''. This blowing action will take place before the second valve is open. Upon moving the handle 48 a sufficient distance however, the rod 36 will operate to raise the valve 25 and the contents of the receptacle 10 in any desired amount will be forced out through aperture 10'', not only by force of gravity but by force of the air pressure upon the upper surface of the contents of receptacle 10. It will be apparent that the opening of valve 30 prior to the opening of valve 25 will permit any material which has deposited or become clogged around the valve 30 to be blown out prior to the beginning of the actual blasting or spraying. Furthermore, where so desired, the handle 48 need only be moved a sufficient distance to raise the valve 30 without raising the valve 25 so that a current of pure air only will be delivered at the nozzle of the spraying hose 50 which communicates with the outlet duct member 33 by means of the elbow 51 and pipe 52.

In the slight modification shown in Fig. 6, I dispense with the form of outlet duct 33 shown in Figs. 1 to 5 and provide a simple outlet duct 60 threaded into engagement with the aperture of the boss 61 of the lower portion 11' of tank 11. The operating handle 48' is secured to the shaft 46' adjacent one extremity thereof, the shaft 46' being movably mounted on the lower portion 11' of the tank 11 itself. The shaft and rod 47' secured to the shaft 46' adjacent one of its extremities is provided with bifurcated arms or yoke 46'' adapted to embrace the rod 36 extending upwardly from the valve 30. A collar 35' is mounted on and secured to the rod 36 just above the yoke 46'' of the rod 47'. The spring 40 extends between said collar 35 and the lower surface of boss 41 in the lower portion 10' of the receptacle 10. It will be apparent that the operation of this device is similar to the preferred form, and in both forms spring 40 serves to normally retain valve 30 in closed position. The weight of the contents of the receptacle 10, together with the air pressure therein, serves to normally keep the valve 25 in closed position.

While I have described and shown my invention with more or less particularity, I do not wish to be unduly restricted to such showing and description beyond the scope of the appended claims.

What I claim is:

1. In a device of the class described, an air tank, a receptacle located within said air tank, said air tank and receptacle being provided with outlet apertures and valves to control the flow through said apertures, said apertures being located one above the other and in alinement therewith, one of said valves being provided with a rod secured thereto, a rod operatively engaging the other of said valves, and means located outside said tank to actuate said rods and thereby open said valves.

2. In a device of the class described, an air tank, a receptacle contained therein, said air tank being provided with an outlet aperture, said receptacle being provided with an outlet aperture located above and in approximate alinement with said air tank aperture, a valve seated in said air tank aperture, said valve being provided with a rod secured to and extending upwardly therefrom, a second valve seated in said receptacle aperture, said second named valve being provided with a downwardly depending stem, said stem being apertured to permit the extremity of said rod to project therein.

3. In a device of the class described, an air tank, a receptacle contained therein, said air tank being provided with an outlet aperture, said receptacle being provided with an outlet aperture located above and in approximate alinement with said air tank aperture, a valve seated in said air tank aperture, said valve being provided with a rod secured to and extending upwardly therefrom, and a second valve seated in said receptacle aperture, said second named valve being provided with a downwardly depending stem, said stem being apertured to permit the extremity of said rod to project therein, said rod being adapted to slide a predetermined amount in said aperture before contacting with the upper portion thereof.

4. In a device of the class described, an air tank a receptacle contained in and supported by said air tank, said air tank and receptacle being provided with outlet apertures, said apertures being located one above the other and in approximate alinement, a valve seated in said air tank aperture, a second valve seated in said receptacle aperture, said first named valve being provided with means tending to normally retain it in closed position with respect to said air tank aperture.

5. In a device of the class described, an air tank, a receptacle contained in and supported by said air tank, said air tank and receptacle being provided with outlet apertures, said apertures being located one above the other and in approximate alinement, a valve seated in said air tank aperture, a second valve seated in said receptacle aperture, said first named valve being provided with means tending to normally retain it in closed position with respect to said air tank aperture, said first named valve being further provided with means adapted to actuate said receptacle valve after a predetermined amount of movement of said first named valve.

6. In a device of the class described, an air tank, a receptacle located within and supported by said air tank, said air tank and said receptacle being provided with outlet apertures, said apertures being located one above the other and in alinement, valves seated in said apertures, said valves being operatively connected, means to operate said valves, said means comprising a handle carried by said air tank on the outer side thereof, and a shaft secured to and operated by said handle, said shaft being journaled in said air tank.

In testimony whereof, I have subscribed my name.

WILLIAM P. MOTT.

Witnesses:
GEO. L. WILKINSON,
HENRY A. PARKS.